United States Patent
Kuchinad et al.

(10) Patent No.: US 8,438,090 B2
(45) Date of Patent: May 7, 2013

(54) INDEX-LINKED NOTES WITH PERIODIC COUPONS SUBJECT TO A TRIGGERING EVENT

(75) Inventors: Amar Kuchinad, New York, NY (US); Alexander Dubitsky, Larchmont, NY (US); Charles McGarraugh, Brooklyn, NY (US); William J. Cassano, Berkeley Heights, NJ (US)

(73) Assignee: Goldman, Sachs & Co., New York, NY (US)

( * ) Notice: Subject to any disclaimer, the term of this patent is extended or adjusted under 35 U.S.C. 154(b) by 641 days.

(21) Appl. No.: 12/098,075

(22) Filed: Apr. 4, 2008

(65) Prior Publication Data
US 2008/0249932 A1   Oct. 9, 2008

Related U.S. Application Data

(60) Provisional application No. 60/910,407, filed on Apr. 5, 2007.

(51) Int. Cl.
*G06Q 40/00*   (2012.01)
(52) U.S. Cl.
USPC .......................................... 705/36 R; 705/35
(58) Field of Classification Search .................. None
See application file for complete search history.

(56) References Cited

U.S. PATENT DOCUMENTS

| | | | |
|---|---|---|---|
| 6,148,293 A * | 11/2000 | King | 705/35 |
| 2002/0107771 A1* | 8/2002 | McGuire | 705/36 |
| 2004/0006520 A1* | 1/2004 | Birle et al. | 705/35 |
| 2005/0010453 A1* | 1/2005 | Terlizzi et al. | 705/4 |
| 2005/0267830 A1* | 12/2005 | Diaz et al. | 705/36 |
| 2006/0041453 A1* | 2/2006 | Clark et al. | 705/4 |
| 2007/0100720 A1* | 5/2007 | Bonvouloir | 705/36 R |

OTHER PUBLICATIONS

Betzold, Nicholas and Berg, Richard, Who's flying the plane? ABA Banking Journal, Jun. 95, vol. 87 issue 6, p. 79, 3pp.*

* cited by examiner

*Primary Examiner* — Rajesh Khattar
*Assistant Examiner* — Carol See
(74) *Attorney, Agent, or Firm* — Perkins Coie LLP

(57) ABSTRACT

Index-linked notes with periodic coupons subject to a triggering event, and accompanying methods, are described herein. In some instances, exemplary notes allow a purchaser to purchase a note and receive periodic coupons returned on the note as long as a triggering event does not occur. Assuming that the triggering event does not occur, the purchaser may receive these coupons until the note reaches maturity. Payment of the periodic coupons may cease, however, when a triggering event (e.g., the purchaser's death) does occur. In addition, the amount of the periodic coupons are tied in some manner to a financial index, such as the Bloomberg index, the S&P 500, or the like.

21 Claims, 4 Drawing Sheets

PRICE/PRINCIPAL ($): 1,000

INDEX: BLOOMBERG

CAP RETURN: 10%

FLOOR RETURN: 4%

VALUATION DATES: EVERY 12 MONTHS

MATURITY DATE (MD): 50 YRS FROM ISSUE

PAYMENT @ MD: 100% PRINCIPAL

TRIGGERING EVENT: PURCHASER'S DEATH

NOTE 108

INDEX-LINKED NOTES WITH PERIODIC COUPONS SUBJECT TO A TRIGGERING EVENT

RELATED APPLICATIONS

This application claims the benefit of U.S. Provisional Application No. 60/910,407, filed Apr. 5, 2007, which is incorporated by reference herein.

BACKGROUND

Traditional coupons attach to notes or bonds either physically or electronically. These traditional coupons generally represent a payment promised to the note or bond holder in exchange for the note or bond holder's loan of money. Rates of return for traditional coupons are often pre-determined and constant throughout the life of the note or bond.

SUMMARY

Exemplary index-linked notes with periodic coupons subject to a triggering event, and accompanying methods, are described herein. In some instances, the exemplary notes allow a purchaser to purchase a note and receive periodic coupons returned on the note as long as a triggering event does not occur. Assuming that the triggering event does not occur, the purchaser may receive these coupons until the note reaches maturity. Payment of the periodic coupons may cease, however, when a triggering event (e.g., the purchaser's death) does occur. In addition, the size of the periodic coupons may tie in some manner to a financial index such as the Bloomberg index, the S&P 500, or the like.

At maturity of the note, the purchaser and/or other recipients may also receive back some portion of the principal originally invested. In some instances, the purchaser may receive back the entire principal that the purchaser invested in the note.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

FIG. 4 illustrates exemplary elements of an index-linked note with periodic coupons subject to a triggering event.

DETAILED DISCUSSION

Overview

This document describes index-linked notes with periodic coupons subject to a triggering event. In some instances, a purchaser buys a note with a given maturity date for a sum of money. The purchaser or other note holder then periodically (e.g., yearly) receives a coupon returned on the note until occurrence of a certain triggering event (e.g., death of the purchaser or note-holder). The amount of each periodic coupon generally ties in some manner to a return of a specified financial index or the like. In addition, the amount of each periodic coupon is generally capped at a specified maximum cap return. Furthermore, this amount typically will not fall below a specified minimum floor return. At the time of the triggering event, meanwhile, payment of periodic coupons may cease. Finally, at the time of maturity of the note, the purchaser of the note and/or another recipient will receive some or all of originally-invested principal.

Exemplary Environment

Figure 1:
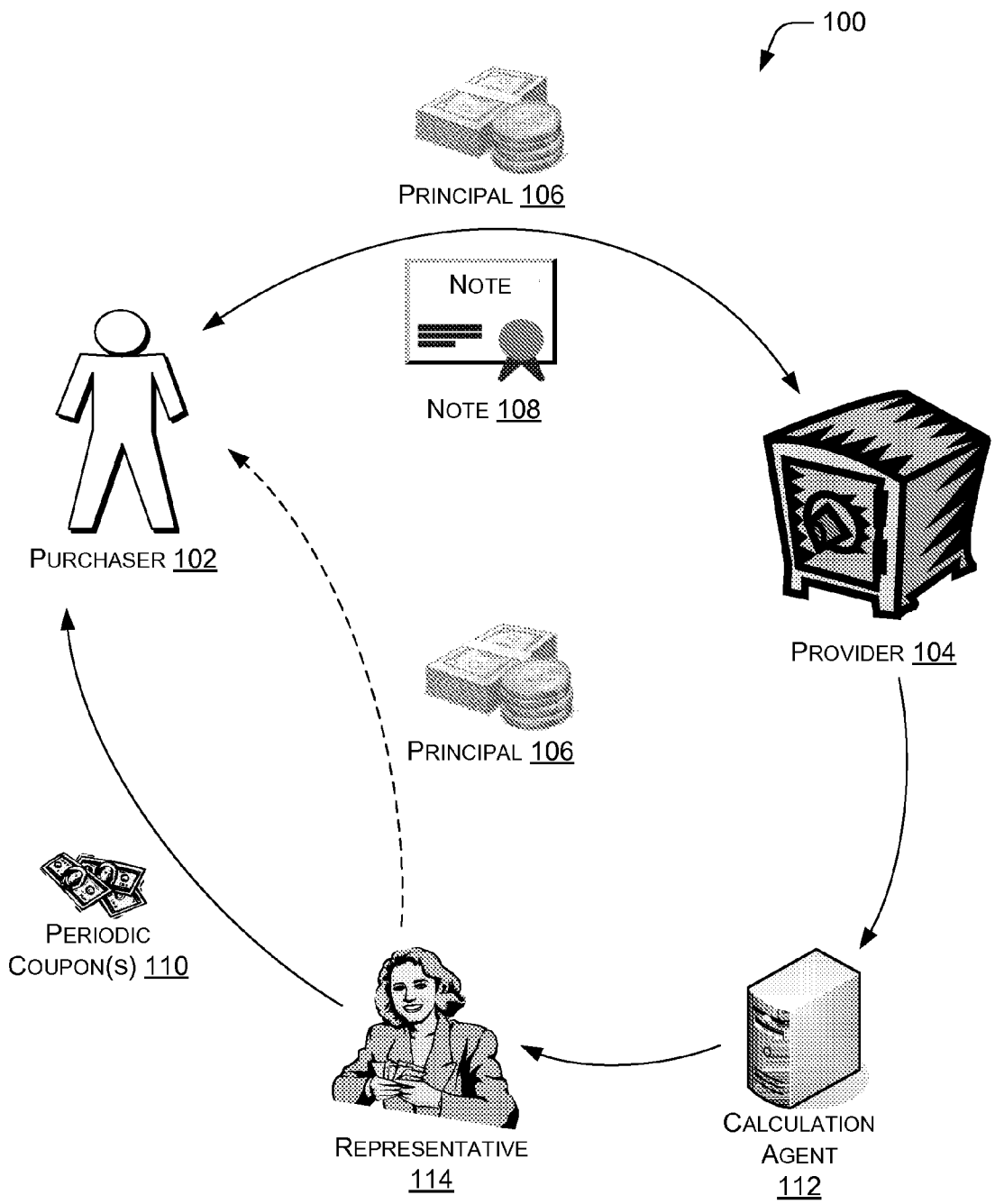
FIG. 1 illustrates an exemplary environment that may utilize the exemplary index-linked notes with periodic coupons subject to a triggering event described herein.

FIG. 1 illustrates an exemplary environment 100 that may utilize embodiments of the index-linked notes with periodic coupons subject to a triggering event described herein. Environment 100 includes a purchaser 102 of a note or bond as well as a provider 104 of notes or bonds. Purchaser 102 may be an individual, partnership, company, or any other purchasing entity. Provider 104, meanwhile, may be a bank, credit union, stock brokerage firm, asset management firm, or any other financial institution or the like.

Environment 100 illustrates that purchaser 102 buys (via payment of principal 106) a note 108 from provider 104. As illustrated, principal 106 generally comprises currency or some other form of consideration. At this point, purchaser 102 now possesses a note 108 that returns periodic coupons 110 subject to a triggering event. If and when the triggering event occurs, return of periodic coupons 110 may cease. Note 108 will also allow for return of principal 106 (or some portion thereof) at a stated maturity date. It is specifically noted that while environment 100 and proceeding methods describe notes, multiple other financial products may also utilize the claimed techniques in some instances.

Returning to FIG. 1, environment 100 also illustrates a calculation agent 112 as well as a representative 114 of note provider 104. Calculation agent 112 serves to calculate an amount of each periodic coupon returned to purchaser 102 on note 108. Representative 114, meanwhile, may be in some way associated with provider 104 and may distribute each periodic coupon 110 to purchaser 102 until occurrence of the triggering event. When the triggering event occurs, distribution of coupons 110 typically ceases. In addition to distributing coupons 110, representative 114 may return some of or the entire principal 106 to purchaser 102 and/or other recipients upon maturation of note 108.

Note that while FIG. 1 illustrates purchaser 102 as receiving coupons 110 and return of principal 106, in some instances note 108 may be sold or otherwise transferred to a secondary recipient. In these instances, the secondary recipient may receive periodic coupons 110 and potentially return of principal 106. Of course, the secondary recipient may also sell or otherwise transfer 108 in these instances.

Exemplary Methods

Figure 2:
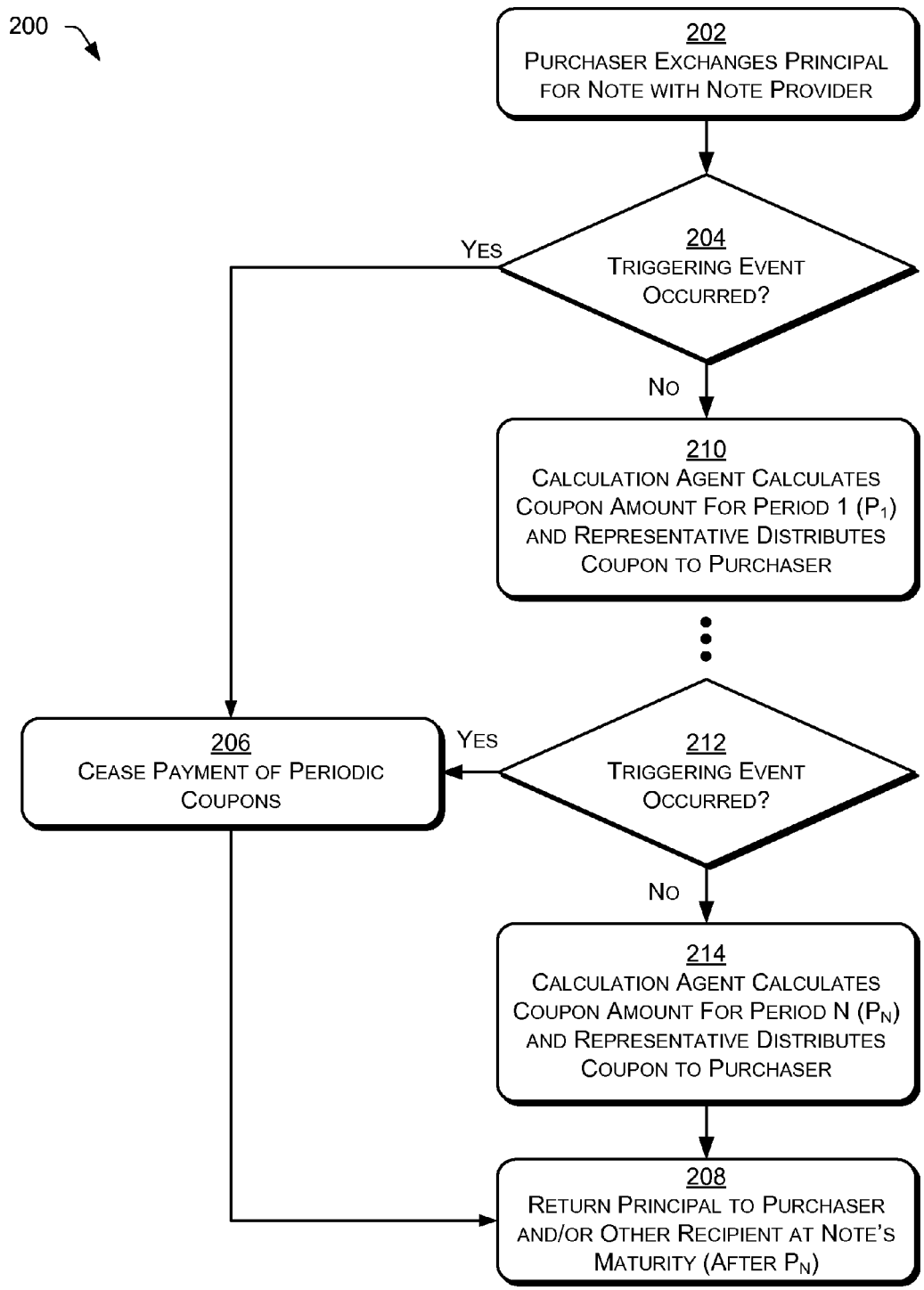
FIG. 2 illustrates an exemplary flow diagram for purchasing an exemplary index-linked note, receiving periodic coupons on the note until occurrence of a triggering event, and receiving back the principal used to purchase the note at the time that the note matures.

FIG. 2 illustrates an exemplary process 200, which is illustrated as a collection of blocks in a logical flow graph, which represent a sequence of operations that can be implemented in hardware, software, or a combination thereof. All other processes described throughout may similarly be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

As discussed above, FIG. 2 illustrates process 200 for purchasing an index-linked note, receiving periodic coupons on the note until occurrence of a triggering event, and receiving back the principal used to purchase the note at the time that the note matures. In some instances, purchaser 102 may receive coupons on a yearly basis. In other instances, each period may comprise a weekly, monthly, or semi-annual amount of time. In still other instances, coupons may be calculated and distributed on a non-periodic (e.g., random) schedule. In addition, while process 200 describes the return of the entire principal, more or less than the amount of principal 106 may also be returned upon maturation of note 108. Again, in some instances note 108 may transfer to another recipient, at which point this recipient may begin receiving coupons 110 and may also receive principal 106 upon the note's maturation.

At act 202, purchaser 102 exchanges principal 106 for note 108 with note provider 104. Act 204 then queries whether a specified triggering event has occurred. Triggering event could be any event or combinations of events that, upon occurrence, results in note provider 104 ceasing payment of periodic coupons 110. In some instances, the triggering event is a death of purchaser 102. In other instances, the triggering event may be the purchaser's attainment of reaching a certain age, a specified performance of a financial index, or possibly the death of a reference person who is not purchaser 102. Multiple other triggering events are envisioned and may also be utilized.

Whatever the triggering event may be, if act 204 determines that the event has occurred, then payment of periodic coupons 110 ceases at act 206. Act 208 then illustrates that the purchaser's invested principal 106 returns to purchaser 102 and/or other recipients upon maturity of note 108. In instances where the triggering event is the death of purchaser 102, the purchaser's beneficiaries may receive principal 106 at act 208. Furthermore, note that FIG. 2 illustrates note 108 as maturing after "N" periods. As such, purchaser 102 and/or other recipients will receive principal 106 after conclusion of the "N" periods. Note that in some instance, the stated maturity date comprises a number of years, such as fifty years.

Returning to act 204, if this act determines that the triggering event has not occurred, then calculation agent 112 calculates a coupon amount for the first period ($P_1$) at act 210. As discussed in detail below with reference to FIG. 3, this calculated coupon amount for the first period may link to a performance of an index for that period. In addition, act 210 illustrates that representative 114 distributes a coupon in this amount to purchaser 102 and/or to another recipient.

FIG. 2 further illustrates that this procedure of querying whether the triggering event has occurred may repeat for each of periods two through "N". For each period, if the triggering event occurs, then payment of periodic coupons ceases and the purchaser or other recipients receive the principal 106 upon the note's maturation. Conversely, if the triggering event has not occurred, then calculation agent 112 calculates an amount of coupon 110 for that period and the coupon is distributed. The process then returns to querying whether the triggering event has occurred before calculating and distributing an amount of a next periodic coupon.

Act 212 illustrates the final query of process 200. If the triggering event has occurred, then acts 206 and 208 follow as discussed above. If the event has not occurred, however, then act 214 illustrates that calculation agent 112 calculates an amount of coupon 110 for the $N^{th}$ and final period. Representative 114 also distributes a coupon in this amount to purchaser 102 during act 214.

In addition, because purchaser 102 and provider 104 have so agreed, note 108 has now reached maturity after "N" periods. Process 200 therefore proceeds to act 208, which again represents that principal 106 returns to the purchaser or other recipients at this maturity date of the note. In instances where the specified triggering event is the death of purchaser 102, the purchaser may herself receive return of principal 106, since the purchaser has survived until the specified maturity of the note.

Figure 3:
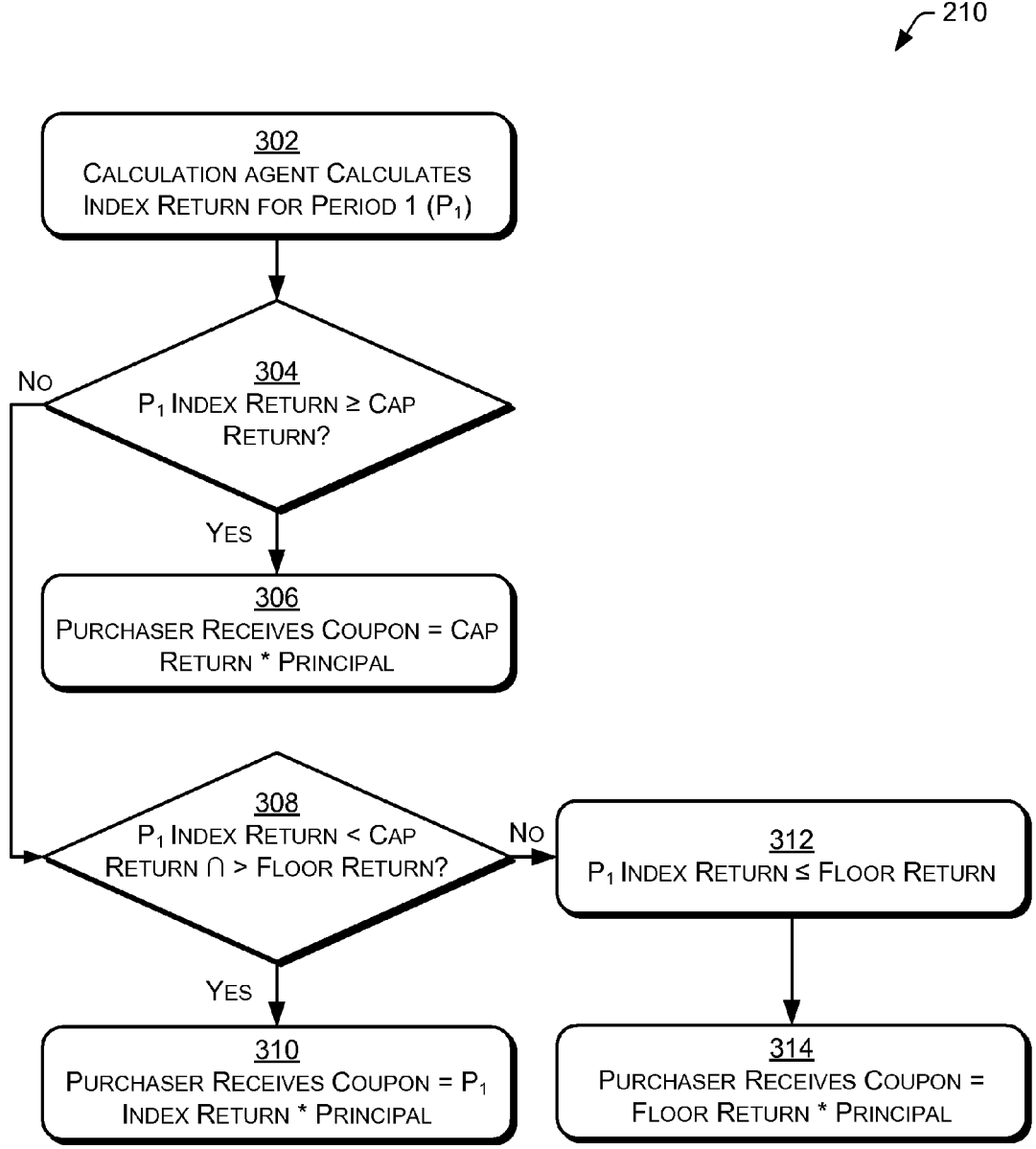
FIG. 3 illustrates an exemplary flow diagram for calculating an amount of a periodic coupon and distributing the periodic coupon to the purchaser.

FIG. 3 illustrates an exemplary flow diagram for completing act 210 of process 200. As discussed above and illustrated by FIG. 2, act 210 calculates an amount of coupon 110 for the first period ($P_1$) and distributes a coupon in this amount to purchaser 102.

Act 210 may begin at act 302 with calculation agent 112 calculating a financial index return for $P_1$. The amount of a coupon 110 for $P_1$ may link to this index return in some manner. Calculation agent 112 may use any index or combination of indexes or the like in order to determine amounts of each periodic coupon 110. For instance, the calculation agent may use a market performance index such as one or more of the following: the Bloomberg® index, the S&P 500®, the Dow Jones® index, a small-cap index, a mid-cap index, a large-cap index, a foreign exchange index, or the like.

Whatever the index utilized, calculation agent 112 may calculate the index return for $P_1$ by first subtracting the index level at the beginning of the period from the index level at the end of the period. The calculation then divides this number by the index level at the beginning of the period and expresses the result as a percentage. The following equations represents this computation:

$$X(i) = \text{Index Level}(P_i) - \text{Index Level}(P_{i-1}) \tag{1}$$

$$\text{Index Return}(P_i) = X(i)/\text{Index Level}(P_{i-1}) \tag{2}$$

Having calculated the proper index return (or returns) for $P_1$, act 304 questions whether this index return is greater than or equal to a maximum cap return (again, expressed as a percentage). This cap return may vary from period-to-period, or it may generally remain constant throughout the life of note 108. If act 304 determines that the index return for $P_1$ is indeed greater than or equal to the cap return, then at act 306 purchaser 102 receives a coupon 110 for $P_1$ in an amount equal to the product of the cap return and the amount of principal 106. Equation (3) represents this computation:

$$\text{Coupon}(P_i) = \text{Cap Return}(P_i) * \text{Principal} \tag{3}$$

If act 304 determines that the index return does not satisfy the query, however, then act 308 questions whether the index return for $P_1$ is less than the cap return but great greater than a pre-determined minimum floor return (again, expressed as a percentage). Again, this floor return may vary periodically, or may generally remain constant. In any event, if the query of act 308 is satisfied, then at act 310 purchaser 102 receives a coupon 110 in an amount equal to the product of the index return for $P_1$ and the amount of principal 106. Equation (4) represents this computation:

$$\text{Coupon}(P_i) = \text{Index Return}(P_i) * \text{Principal} \tag{4}$$

If the index return does not satisfy the query of act 308, meanwhile, then act 312 determines that the index return for $P_1$ is less than or equal to the floor return. Act 314 then represents that purchaser 102 receives a coupon 110 equal to the product of the floor return and the amount of principal 106. Equation (5) represents this computation:

$$\text{Coupon}(P_i) = \text{Floor Return}(P_i) * \text{Principal} \quad (5)$$

Exemplary Index-Linked Note with Principal Protection

FIG. 4 illustrates exemplary elements of index-linked note 108 with periodic coupons subject to a triggering event. Note 108 may include many or all of the elements present in a traditional note. In addition, note 108 may include elements unique to the notes discussed above in regards to FIGS. 1-3. In some instances, information depicted within note 108 may be implemented as a data structure encoded on one or more computer-readable media. Again, although FIG. 4 illustrates note 108, other financial instruments may be similarly created.

As illustrated, note 108 states a price/principal (e.g., $1,000). While FIG. 4 illustrates that the price and principal of note 108 are equal, in other instances these numbers may differ. For instance, the price of the note may be greater than a purchaser's principal represented by note 108.

Note 108 also identifies one or more indexes (e.g., Bloomberg) to which the note and associated coupons may link. Note 108 also specifies a cap return (e.g., 10%) and a floor return (e.g., 4%). While FIG. 4 illustrates a single cap return and a single floor return for the life of the note, these returns may also vary throughout the life of the note, similar to the returns shown table 1 reproduced below.

Note 108 also specifies how often coupons will be issued to the note holder (e.g., purchaser 102). In the illustrated embodiment, coupons will generally issue every twelve months. In addition, note 108 also specifies a maturity date (e.g., fifty years). As discussed above, the purchaser and/or other recipients may receive a portion of the purchaser's originally-invested principal at the note's maturity date. FIG. 4 illustrates that in the illustrated embodiment, the note holder will receive 100% of the purchaser's invested principal (i.e., $1,000).

Finally, note 108 specifies the triggering event, upon which payment of periodic coupons may cease. In the illustrated embodiment, the triggering event is the death of the purchaser. As discussed above, however, other triggering events may be similarly utilized to determine when payment of periodic coupons should cease.

Exemplary Collateralized Loan

It is specifically noted that while the above discussion focuses on issuance of notes, other structures may similarly be utilized to achieve the desired effect. In the example of a collateralized loan, provider 104 may loan purchaser 102 principal 106 in exchange for purchaser 102 pledging one or more tangible or intangible assets. Purchaser 102 may thereafter again receive periodic payments similar to coupons 110, with the payments being subject to a triggering event as discussed above. Furthermore, at a stated date, provider 104 may relieve purchaser 102 or the purchaser's estate of the purchaser's loan obligation. The periodic payments may also cease at this point, if they have not already ceased due to occurrence of the triggering event.

In the example of a collateralized loan, provider 104 may charge an additional fee to purchaser 102. For instance, provider 104 may require purchaser 102 to pay a fee to provider 104 at the beginning of the transaction, during the time for periodic payments, and/or after the stated date at which provider 104 relieves purchaser 102 of the purchaser's loan obligation.

Exemplary Swap Arrangement

In addition to the structures discussed above, swap arrangements may also utilize the concepts and techniques discussed above. As is well known in the art, swap arrangements typically allow parties to exchange one stream of cash flows against another. Although any party may utilize this structure, swap arrangements may be particularly useful when both parties to the swap are large financial institutions or the like.

Within this structure, a first party (e.g., purchaser 102 from FIG. 1) would pay a second party (e.g., provider 104 from FIG. 1) some variable or fixed interest rate. For instance, the first party may pay the second party a variable interest rate of London Interbank Offered Rate (LIBOR) plus 60 basis points (bps). In return, the second party may make index-linked periodic payments to the first party. The amount of each periodic payment may link to a financial index return or the like, as discussed above in regards to index-linked notes. In addition, these payments may depend upon non-occurrence of one or more triggering events. In one instance, these payments may depend upon the mortality of a reference pool, as discussed below. This reference pool may comprise any arbitrary or systematic grouping of individuals.

For instance, imagine a reference pool that comprises 1,000 individuals. For each individual who survives a period (e.g., a year), the second party may pay the first party an index-linked amount for that individual. When that individual dies, however, the payment for that individual from the second party to the first party ceases. As such, the death of that individual is similar to the triggering event discussed above, wherein the index-linked payment associated with that individual ceases when the individual dies.

When all of the 1,000 individuals within the reference pool die, then all index-linked payments from the second party to the first party may cease. Furthermore, upon a stated date, interest payments from the first party to the second party may also cease. In addition, note that amounts of index-linked payments from the second party to the first party may utilize the equations discussed above in regards to index-linked notes.

Other Embodiments

This section describes other embodiments of the tools and techniques described above. It is specifically noted that while the following embodiments discuss exemplary values within certain fields, these values are merely exemplary and may be substituted with multiple other differing values.

Enhanced Participation Index-Linked Notes with 100% Principal Protection

Structure Summary

The note is 100% principal protected, has a 50 year maturity (or any other length of maturity), for example, and is linked to an Index (e.g., Bloomberg). Contingent upon the non-occurrence of a Trigger Event, the note provides annual coupons linked to the return of the Index, subject to a maximum annual coupon (e.g., a certain percentage) and a minimum annual coupon (e.g., a certain percentage. See table 1. At maturity, the note holders may receive 100% of their principle invested, or some other portion that is less than or greater than 100% of their principle invested.

Indicative Illustrative and Non-Limiting Terms

Issuer: TBD

Index: Bloomberg

Reference Person: The individual named in the Note as the Reference Person

Specified Currency: U.S. Dollars, etc.

Issue price: 100% of face amount

Face amount: $1,000 per note

Trade date: TBD

Settlement Date: TBD
Stated Maturity Date: The third Trading Day following the Valuation Date in, e.g., the 50th year after the year of the Settlement Date, unless postponed due to a market disruption event or otherwise
Coupon Payment Date: The third trading day following Valuation Dates
Coupon Rate: Unless a Trigger Event (e.g., death of the purchaser) has occurred prior to the relevant Coupon Date, the notes will pay an annual amount equal to:
  If the Index Return is greater than or equal to the Annual Cap Return, Annual Cap Return
  If the Index Return is less than the Annual Cap Return but greater than the Annual Floor Return, Index Return
  If the Index Return is less than or equal to the Annual Floor Return, Annual Floor Return
Trigger Event: The discontinuance of the life of the Reference Person at any time prior to or on the Stated Maturity Date, the date of such Trigger Event, the "Trigger Event Date"
Annual Cap Return: See table 1 below
Annual Floor Return: See table 1 below
Annual Index return: Annually, the result of (1) the Final index level minus the Initial index level divided by (2) the Initial index level, expressed as a percentage
Initial Index Level:
  (i) With respect to the Initial Valuation Date, to be determined on the trade date
  (ii) With respect to the subsequent Valuation Dates, the Final Price of the Index on the Valuation Date immediately preceding such Valuation Date
Final Index Level: With respect to each Valuation Date, the Official Closing Price for the Index on that Valuation Date
Valuation Dates: Every twelve months on the calendar day of the related month, starting twelve calendar months after the Trade Date until the earlier of the Trigger Event Date or the Expiration Date. The Valuation Dates are subject to postponement due to a market disruption event or non-Business Days (as described in the pricing supplement).
Redemption Amount: On the stated maturity date, you may receive an amount in cash per note equal to: 100% of face value
No listing: The notes may or may not be listed on any securities exchange or interdealer market quotation system
Calculation agent: TBD.

TABLE 1

| VALUATION DATE | ANNUAL RETURN CAP (%) | ANNUAL RETURN FLOOR (%) |
| --- | --- | --- |
| Trade Date + 1 yr | 10.00 | 4.00 |
| Trade Date + 2 yr | 10.00 | 4.00 |
| Trade Date + 3 yr | 10.00 | 4.00 |
| Trade Date + 4 yr | 10.00 | 4.00 |
| Trade Date + 5 yr | 10.00 | 4.00 |
| Trade Date + 6 yr | 10.00 | 4.00 |
| Trade Date + 7 yr | 10.00 | 4.00 |
| Trade Date + 8 yr | 10.00 | 4.00 |
| Trade Date + 9 yr | 10.00 | 4.00 |
| Trade Date + 10 yr | 10.00 | 4.00 |
| Trade Date + 11 yr | 9.00 | 5.00 |
| Trade Date + 12 yr | 9.00 | 5.00 |
| Trade Date + 13 yr | 9.00 | 5.00 |
| Trade Date + 14 yr | 9.00 | 5.00 |
| Trade Date + 15 yr | 9.00 | 5.00 |
| Trade Date + 16 yr | 8.50 | 5.50 |
| Trade Date + 17 yr | 8.50 | 5.50 |
| Trade Date + 18 yr | 8.50 | 5.50 |
| Trade Date + 19 yr | 8.50 | 5.50 |
| Trade Date + 20 yr | 8.50 | 5.50 |
| Trade Date + 21 yr | 8.00 | 6.00 |
| Trade Date + 22 yr | 8.00 | 6.00 |
| Trade Date + 23 yr | 8.00 | 6.00 |
| Trade Date + 24 yr | 8.00 | 6.00 |
| Trade Date + 25 yr | 8.00 | 6.00 |
| Trade Date + 26 yr | 7.00 | 7.00 |
| Trade Date + 27 yr | 7.00 | 7.00 |
| Trade Date + 28 yr | 7.00 | 7.00 |
| Trade Date + 29 yr | 7.00 | 7.00 |
| Trade Date + 30 yr | 7.00 | 7.00 |
| Trade Date + 31 yr | 7.00 | 7.00 |
| Trade Date + 32 yr | 7.00 | 7.00 |
| Trade Date + 33 yr | 7.00 | 7.00 |
| Trade Date + 34 yr | 7.00 | 7.00 |
| Trade Date + 35 yr | 7.00 | 7.00 |
| Trade Date + 36 yr | 7.00 | 7.00 |
| Trade Date + 37 yr | 7.00 | 7.00 |
| Trade Date + 38 yr | 7.00 | 7.00 |
| Trade Date + 39 yr | 7.00 | 7.00 |
| Trade Date + 40 yr | 7.00 | 7.00 |
| Trade Date + 41 yr | 7.00 | 7.00 |
| Trade Date + 42 yr | 7.00 | 7.00 |
| Trade Date + 43 yr | 7.00 | 7.00 |
| Trade Date + 44 yr | 7.00 | 7.00 |
| Trade Date + 45 yr | 7.00 | 7.00 |
| Trade Date + 46 yr | 7.00 | 7.00 |
| Trade Date + 47 yr | 7.00 | 7.00 |
| Trade Date + 48 yr | 7.00 | 7.00 |
| Trade Date + 49 yr | 7.00 | 7.00 |
| Trade Date + 50 yr | 7.00 | 7.00 |

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more non-transitory computer-readable media storing computer-executable instructions that, when executed on one or more processors, perform acts comprising:
  selling an index-linked note with a maturity date to a purchaser in exchange for payment of principal by the purchaser;
  periodically determining whether a specified triggering event has occurred, wherein the triggering event comprises a death of the purchaser of the index-linked note or a death of a reference person;
  responsive to determining that the specified triggering event has occurred, ceasing payment of periodic coupons associated with the index-linked note to the purchaser;
  responsive to determining that the specified triggering event has not occurred, calculating a coupon amount for payment to the purchaser of the index-linked note for a corresponding time period, wherein the coupon amount is equal to a product of:
    a principal of the index-linked note and a return of a specified financial index for the corresponding time period if the return of the specified financial index is less than a specified cap return but greater than a specified floor return;

the principal of the index-linked note and the specified cap return if the return of the specified financial index for the corresponding time period is greater than the specified cap return and greater than the specified floor return; and the principal of the index-linked note and the specified floor return if the return of the specified financial index for the corresponding time period is less than the specified floor return and less than the specified cap return.

2. One or more non-transitory computer-readable media as recited in claim 1, further storing computer-executable instructions that, when executed on the one or more processors, perform acts comprising:

determining a maturity date of the index-linked note; and periodically determining whether the maturity date of the index-linked note has been reached.

3. One or more non-transitory computer-readable media as recited in claim 2, further storing computer-executable instructions that, when executed on the one or more processors, perform acts comprising:

responsive to determining that the maturity date has been reached, outputting an indication that the principal of the index-linked note is to be returned to the purchaser or to a current holder of the index-linked note.

4. A computer processor-implemented method comprising:

selling an index-linked note with a maturity date to a purchaser in exchange for payment of principal by the purchaser;

querying by a computer processor whether a triggering event has occurred during a respective time period;

responsive to determining that the triggering event has not occurred during the respective time period:

calculating by a computer processor an amount of a coupon to be issued to the purchaser, and issuing the coupon in the calculated amount to the purchaser or to a current holder of the index-linked note, wherein the calculating of the amount of the coupon and the issuing of the coupon comprises:

if a percentage performance of the financial index during the respective time period is less than a specified cap return but more than a specific floor return, then issuing a coupon in the amount of the principal of the index-linked note and the percentage performance of the financial index during the respective time period;

if the percentage performance of the financial index during the respective time period is greater than the specified cap return and the specified floor return, then issuing a coupon in the amount of a product of the principal of the index-linked note and the specified cap return; and if the percentage performance of the financial index during the respective time period is less than the specified floor return and the specified cap return, then issuing a coupon in the amount of a product of the principal of the index-linked note and the specified floor return; and responsive to determining that the triggering event has occurred during the respective time period, ceasing payment of periodic coupons.

5. A method as recited in claim 4, further comprising returning a portion or an entirety of the principal to the purchaser or to a current holder of the index-linked note at the maturity date of the index-linked note.

6. A method as recited in claim 4, wherein the triggering event is the death of the purchaser or the death of another reference person.

7. A method as recited in claim 4, wherein the financial index is a third party index that is not associated with an entity selling the index-linked note to the purchaser.

8. A method as recited in claim 7, wherein the third party financial index comprises a market performance index.

9. A method as recited in claim 4, wherein the issuing of a coupon occurs on a periodic basis if the triggering event has not occurred for each respective time period.

10. A method as recited in claim 9, wherein the periodic basis is a yearly basis.

11. A computer processor-implemented method comprising:

selling an index-linked note with a stated maturity date to a holder in exchange for payment of principal by the holder;

determining by a computer processor whether a triggering event has occurred during a time period of the index-linked note, wherein the index-linked note specifies that the holder of the index-linked note is entitled to periodically receive payment in the form of a coupon until the stated maturity date, at which point the holder of the index-linked note or another entity is entitled to receive the principal paid for the index-linked note; and if the triggering event has not occurred during the time period of the index-linked note, then calculating an amount of a coupon to be paid to the holder of the index-linked note by referencing a return of a financial index during the time period; and wherein the index-linked note further specifies a floor return and a cap return for the periodic coupons, and wherein the calculating of the amount of the coupon comprises:

determining a product of the return of the financial index and the principal paid for the index-linked note if the return of the financial index is less than the cap return but greater than the floor return;

determining a product of the cap return and the principal paid for the index-linked note if the return of the financial index is greater than the cap return and greater than the floor return; and determining a product of the floor return and the principal paid for the index-linked note if the return of the financial index is less than the cap return and less than the floor return.

12. A method as recited in claim 11, further comprising issuing the coupon in the calculated amount to the holder of the index-linked note.

13. A method as recited in claim 11, further comprising:

after the calculating of the amount of the coupon, issuing the coupon in the calculated amount to the holder of the index-linked note; and repeating the determining of whether the triggering event has occurred for each respective time period specified by the index-linked note.

14. A method as recited in claim 11, further comprising:

determining whether the stated maturity date of the index-linked note has been reached; and dispersing the principal paid for the index-linked note to the holder or to another entity if it is determined that the stated maturity date of the index-linked note has been reached.

15. A method as recited in claim 11, wherein the triggering event is the death of a purchaser of the index-linked note, the death of the holder of the index-linked note, or the death of another reference person.

16. A method as recited in claim 11, wherein the financial index is a third party index that is not associated with an entity that sold the index-linked note.

17. One or more non-transitory computer-readable media storing computer-executable instructions that, when executed on one or more processors, perform acts comprising:
- selling an index-linked note with a stated maturity date to a holder in exchange for payment of principal by the holder;
- determining whether a triggering event has occurred during a time period of the index-linked note, wherein the index-linked note specifies that the holder of the index-linked note is entitled to periodically receive payment in the form of a coupon until the stated maturity date, at which point the holder of the index-linked note or another entity is entitled to receive the principal paid for the index-linked note; and
- if the triggering event has not occurred during the time period of the index-linked note, then calculating an amount of a coupon to be paid to the holder of the index-linked note by referencing a return of a financial index; and
- wherein the index-linked note further specifies a floor return and a cap return for the periodic coupons, and wherein the calculating of the amount of the coupon comprises:
  - multiplying the return of the financial index by the principal paid for the index-linked note if the return of the financial index is less than the cap return but greater than the floor return;
  - multiplying the cap return by the principal paid for the index-linked note if the return of the financial index is greater than the cap return and greater than the floor return; and
  - multiplying the floor return by the principal paid for the index-linked note if the return of the financial index is less than the cap return and less than the floor return.

18. One or more non-transitory computer-readable media as recited in claim 17, further comprising:
- after the calculating of the amount of the coupon, repeating the determining of whether the triggering event has occurred for each respective time period specified by the index-linked note.

19. One or more non-transitory computer-readable media as recited in claim 17, further comprising:
- determining whether the stated maturity date of the index-linked note has been reached; and
- causing dispersion of the principal paid for the index-linked note to the holder or to another entity if it is determined that the stated maturity date of the index-linked note has been reached.

20. One or more non-transitory computer-readable media as recited in claim 17, wherein the triggering event is the death of a purchaser of the index-linked note, the death of the holder of the index-linked note, or the death of another reference person.

21. One or more non-transitory computer-readable media as recited in claim 17, wherein the financial index is a third party index that is not associated with an entity that sold the index-linked note.

* * * * *